United States Patent
Kim et al.

(10) Patent No.: US 12,172,897 B2
(45) Date of Patent: Dec. 24, 2024

(54) PYROLYSIS GAS REFORMING SYSTEM

(71) Applicant: DOOSAN ENERBILITY CO., LTD, Changwon (KR)

(72) Inventors: Bong Keun Kim, Yongin (KR); Sung Jin Cho, Gimhae (KR); Gyeong Mo Nam, Yongin (KR); Su Nam You, Yongin (KR); Jae Yong Jeong, Sejong (KR)

(73) Assignee: DOOSAN ENERBILITY CO., LTD., Changwon (KR)

( * ) Notice: Subject to any disclaimer, the term of this patent is extended or adjusted under 35 U.S.C. 154(b) by 511 days.

(21) Appl. No.: 17/551,561

(22) Filed: Dec. 15, 2021

(65) Prior Publication Data

US 2023/0106515 A1 Apr. 6, 2023

(30) Foreign Application Priority Data

Oct. 6, 2021 (KR) .......................... 10-2021-0132412

(51) Int. Cl.
   *C01B 3/48* (2006.01)
   *C01B 3/38* (2006.01)
   (Continued)

(52) U.S. Cl.
   CPC ............... *C01B 3/48* (2013.01); *C01B 3/382* (2013.01); *C01B 3/50* (2013.01); *C10B 53/07* (2013.01);
   (Continued)

(58) Field of Classification Search
   CPC .. C01B 3/48; C01B 3/382; C01B 3/50; C10B 53/07; C10K 1/002
   See application file for complete search history.

(56) References Cited

U.S. PATENT DOCUMENTS

2005/0247553 A1* 11/2005 Ichikawa ............... C10K 3/006
                                                              202/96
2007/0214719 A1*  9/2007 Yoshikawa .............. C10J 3/463
                                                              48/61
(Continued)

FOREIGN PATENT DOCUMENTS

JP    2003243019 A  *  8/2003
JP    2004339360 A  *  12/2004
(Continued)

OTHER PUBLICATIONS

Machine translation of JP2005/255842A (Jun. 26, 2024) (Year: 2024).*

(Continued)

*Primary Examiner* — Matthew J Merkling
(74) *Attorney, Agent, or Firm* — Harvest IP Law, LLP (57) ABSTRACT

A pyrolysis gas reforming system is provided. The pyrolysis gas reforming system includes a pyrolysis unit configured to perform pyrolysis of waste, an oil-gas separation unit configured to separate a product generated by the pyrolysis unit into oil and gas, a pyrolysis gas purification unit configured to refine pyrolysis gas generated through the separation by the oil-gas separation unit, a pyrolysis gas reforming unit configured to generate synthesis gas by reforming the pyrolysis gas purified by the pyrolysis gas purification unit, a hydrogen gas shift reaction unit configured to convert carbon monoxide contained in the synthesis gas generated by the pyrolysis gas reforming unit into hydrogen and carbon dioxide, and a hydrogen separation unit configured to separate hydrogen from the synthesis gas discharged from the hydrogen gas shift reaction unit, wherein combustion gas generated by a burner of the pyrolysis gas reforming unit and used to supply heat to the pyrolysis gas reforming unit is used to supply heat to the pyrolysis unit.

15 Claims, 5 Drawing Sheets

(51) Int. Cl.
  *C01B 3/50* (2006.01)
  *C10B 53/07* (2006.01)
  *C10K 1/00* (2006.01)

(52) U.S. Cl.
  CPC ...... *C10K 1/002* (2013.01); *C01B 2203/0216* (2013.01); *C01B 2203/0283* (2013.01); *C01B 2203/04* (2013.01); *C01B 2203/062* (2013.01); *C01B 2203/0816* (2013.01); *C01B 2203/1235* (2013.01); *C01B 2203/1258* (2013.01); *C01B 2203/148* (2013.01); *C01B 2203/84* (2013.01)

(56) References Cited

U.S. PATENT DOCUMENTS

| | | | | |
|---|---|---|---|---|
| 2009/0239279 | A1* | 9/2009 | Hall | C10G 2/32 435/167 |
| 2010/0122627 | A1* | 5/2010 | Schwartz | B01D 71/028 96/4 |
| 2011/0147193 | A1* | 6/2011 | Omoto | C10G 1/02 202/96 |
| 2012/0294783 | A1* | 11/2012 | Palamara | C01B 3/48 422/625 |
| 2017/0022425 | A1* | 1/2017 | Baird | C10G 3/50 |

FOREIGN PATENT DOCUMENTS

| | | | |
|---|---|---|---|
| JP | 2005255842 | A * | 9/2005 |
| JP | 2008024754 | A * | 2/2008 |

OTHER PUBLICATIONS

Machine translation of JP2008024754A (Jun. 26, 2024) (Year: 2024).*
Machine Translation of KR20110127915A (Jun. 26, 2024) (Year: 2024).*
Machine Translation of JP2004339360A (Jun. 26, 2024) (Year: 2024).*
Machine Translation of JP2003243019A (Jun. 26, 2024) (Year: 2024).*

* cited by examiner

PYROLYSIS GAS REFORMING SYSTEM

CROSS REFERENCE TO RELATED APPLICATION

This application claims priority to Korean Patent Application No. 10-2021-0132412, filed on Oct. 6, 2021, the disclosure of which is incorporated herein by reference in its entirety.

BACKGROUND

1. Field

Apparatuses and methods consistent with exemplary embodiments relate to a pyrolysis gas reforming system, and more particularly, to a pyrolysis gas reforming system capable of maximizing hydrogen production through reforming pyrolysis gas by supplying waste heat to a pyrolysis unit that pyrolyzes waste.

2. Description of the Related Art

With the development of the industry, the production of products using plastics or synthetic rubber as raw materials is rapidly increasing. However, the recycling rate of wastes such as waste plastics and rubber is insignificant compared to the total production of plastic or rubber products due to economic burden and quality deterioration of products manufactured from recycled plastics or rubber.

Accordingly, there are attempts to convert waste into energy. Incineration is one of the attempts, but there is a problem that causes air pollution. Therefore, pyrolysis is attracting attention as a method of converting waste into energy.

Conventionally, there were methods of obtaining oil by heating waste to melt and decompose waste to produce impure oils and refining the impure oils. However, as hydrogen energy has recently been spotlighted as a future energy source, it is necessary to develop a method for producing hydrogen by reforming gas generated through waste pyrolysis.

High temperature pyrolysis (e.g., about 750° C.) is required to obtain a pyrolysis gas containing a large amount of low hydrocarbons with a small number of hydrocarbon atoms through pyrolysis of waste, compared to a related art low-temperature pyrolysis (e.g., about 450° C.) for obtaining oil by pyrolysis of waste. Therefore, there is a problem in that an efficiency may be lowered due to an increase in energy consumption for the high temperature pyrolysis.

SUMMARY

Aspects of one or more exemplary embodiments provide a pyrolysis gas reforming system capable of maximizing hydrogen production through reforming pyrolysis gas by supplying waste heat to a pyrolysis unit that pyrolyzes waste.

Additional aspects will be apparent in part in the description which follows and, in part, will become apparent from the description from the following description, or may be learned by practice of the exemplary embodiments.

According to an aspect of an exemplary embodiment, there is provided a pyrolysis gas reforming system including: a pyrolysis unit configured to perform pyrolysis of waste; an oil-gas separation unit configured to separate a product generated by the pyrolysis unit into oil and gas; a pyrolysis gas purification unit configured to refine pyrolysis gas generated through the separation by the oil-gas separation unit; a pyrolysis gas reforming unit configured to generate synthesis gas by reforming the pyrolysis gas purified by the pyrolysis gas purification unit; a hydrogen gas shift reaction unit configured to convert carbon monoxide contained in the synthesis gas generated by the pyrolysis gas reforming unit into hydrogen and carbon dioxide; and a hydrogen separation unit configured to separate hydrogen from the synthesis gas discharged from the hydrogen gas shift reaction unit, wherein combustion gas generated by a burner of the pyrolysis gas reforming unit and used to supply heat to the pyrolysis gas reforming unit is used to supply heat to the pyrolysis unit.

The system may further include a steam generation unit configured to generate steam and supply the steam to the pyrolysis gas reforming unit.

The combustion gas discharged from the pyrolysis gas reforming unit may be used to supply heat to the pyrolysis unit after supplying heat to the steam generation unit.

Exhaust gas discharged from the hydrogen separation unit may be used to supply heat to the pyrolysis unit.

The system may further include an oil heating unit configured to heat the oil produced through the oil and gas separation performed by the oil-gas separation unit.

Volatile gas generated in the oil heating unit may be separated and supplied to the pyrolysis gas purification unit together with the pyrolysis gas.

Tar may be removed by spraying the oil from which the volatile gas is removed by the oil heating unit to the oil-gas separation unit.

The oil from which the volatile gas is removed by the oil heating unit may be supplied to a burner of the pyrolysis unit and burned.

The oil from which the volatile gas is removed by the oil heating unit may be supplied to the burner of the pyrolysis gas reforming unit and burned.

In the oil heating unit, the oil may be heated by at least one gas selected from among the combustion gas discharged from the pyrolysis gas reforming unit, the exhaust gas discharged from the hydrogen separation unit, and the combustion gas generated by the burner of the pyrolysis unit, used to supply heat to the pyrolysis unit, and then discharged.

The system may further include a hydrogen turbine driven using oxygen received from the hydrogen separation unit.

Exhaust gas discharged from the hydrogen turbine may be used to supply heat to the pyrolysis gas reforming unit.

The pyrolysis gas may be supplied to a burner of the pyrolysis unit and burned.

The pyrolysis gas may be supplied to the burner of the pyrolysis gas reforming unit and burned.

According to an aspect of another exemplary embodiment, there is provided a pyrolysis gas reforming system including: a pyrolysis unit configured to perform pyrolysis of waste; an oil-gas separation unit configured to separate a product generated by the pyrolysis unit into oil and gas; a pyrolysis gas purification unit configured to refine pyrolysis gas generated through the separation by the oil-gas separation unit; a pyrolysis gas reforming unit configured to generate synthesis gas by reforming the pyrolysis gas purified by the pyrolysis gas purification unit; a hydrogen gas shift reaction unit configured to convert carbon monoxide contained in the synthesis gas generated by the pyrolysis gas reforming unit into hydrogen and carbon dioxide; and a hydrogen separation unit configured to separate hydrogen from the synthesis gas discharged from the hydrogen gas shift reaction unit, wherein exhaust gas discharged from the hydrogen separation unit is used to supply heat to the pyrolysis unit.

The system may further include an oil heating unit configured to heat the oil produced through the oil and gas separation performed by the oil-gas separation unit.

The oil from which volatile gas is removed by the oil heating unit may be supplied as fuel to a burner of the pyrolysis unit and burned to generate combustion gas.

The oil from which volatile gas is removed by the oil heating unit may be supplied to a burner of the pyrolysis gas reforming unit and burned.

According to one or more exemplary embodiments, waste heat of combustion gas discharged from a pyrolysis gas reforming unit and/or waste heat of exhaust gas discharged from a hydrogen separation unit are supplied to a pyrolysis unit that thermally decomposes waste. This increases the production of pyrolysis gas and reduces the amount of pyrolysis gas consumed in a burner.

In addition, it is possible to maximize the pyrolysis gas production by using waste heat to reheat the oil produced by the oil-gas separation.

In addition, because the oil is supplied to the burner of the pyrolysis unit and/or the burner of the pyrolysis gas reforming unit and burned by the burner, the amount of pyrolysis gas burned by the burner can be minimized.

That is, it is possible to maximize hydrogen production through reforming of pyrolysis gas.

BRIEF DESCRIPTION OF THE DRAWINGS

The above and other aspects will be more apparent from the following description of the exemplary embodiments with reference to the accompanying drawings, in which.

DETAILED DESCRIPTION

Various modifications and various embodiments will be described with reference to the accompanying drawings. However, it should be noted that the various embodiments are not for limiting the scope of the disclosure to the specific embodiment, but they should be interpreted to include all modifications, equivalents, or substitutions of the embodiments included within the spirit and scope disclosed herein.

The terminology used herein is for the purpose of describing specific embodiments only and is not intended to limit the scope of the disclosure. The singular expressions "a", "an", and "the" are intended to include the plural expressions as well unless the context clearly indicates otherwise. In the disclosure, terms such as "comprises", "includes", or "have/has" should be construed as designating that there are such features, integers, steps, operations, components, parts, and/or combinations thereof, not to exclude the presence or possibility of adding of one or more of other features, integers, steps, operations, components, parts, and/or combinations thereof.

Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or any variations of the aforementioned examples.

Exemplary embodiments will be described below in detail with reference to the accompanying drawings. It should be noted that like reference numerals refer to like parts throughout the various figures and exemplary embodiments. In certain embodiments, a detailed description of functions and configurations well known in the art may be omitted to avoid obscuring appreciation of the disclosure by a person of ordinary skill in the art. For the same reason, some components may be exaggerated, omitted, or schematically illustrated in the accompanying drawings.

Figure 1:
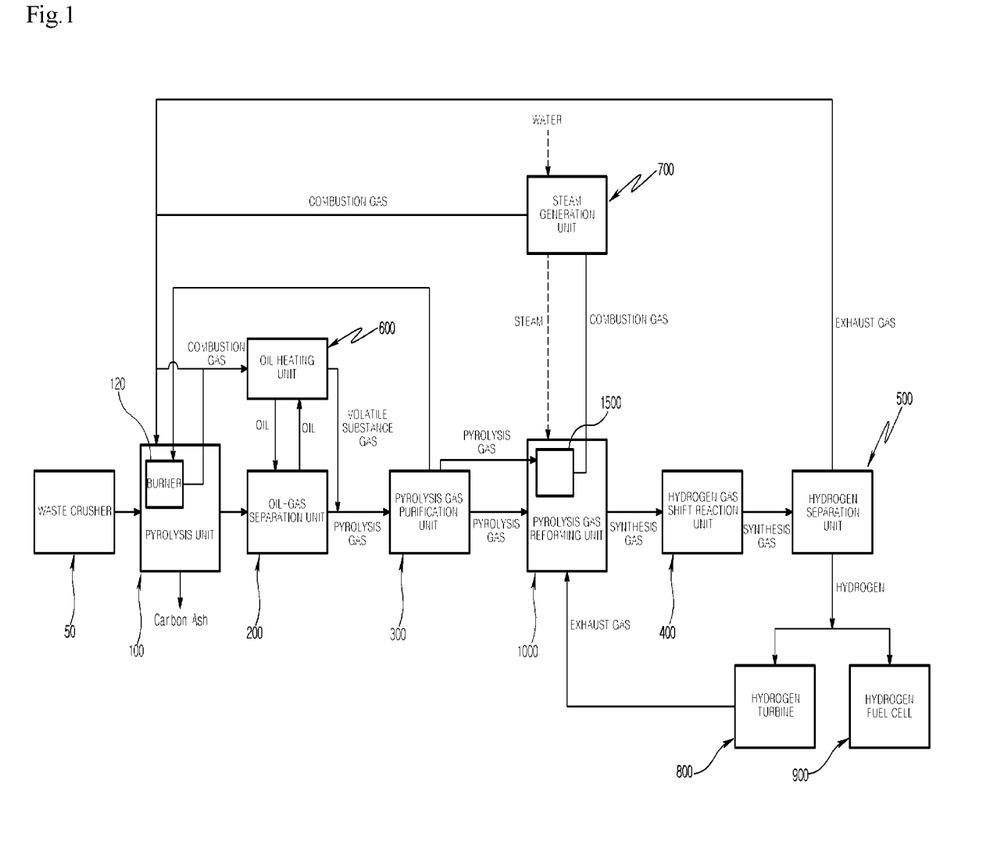
FIG. 1 is a schematic view illustrating a pyrolysis gas reforming system according to a first exemplary embodiment.

Hereinafter, a pyrolysis gas reforming system according to a first exemplary embodiment will be described with reference to the accompanying drawings. FIG. 1 is a schematic view illustrating a pyrolysis gas reforming system according to a first exemplary embodiment.

Referring to FIG. 1, a pyrolysis gas reforming system includes a pyrolysis unit 100, an oil-gas separation unit 200, a pyrolysis gas purification unit 300, a pyrolysis gas reforming unit 1000, a hydrogen gas shift reaction unit 400, a hydrogen separation unit 500, an oil heating unit 600, a steam generation unit 700, a hydrogen turbine 800, and a hydrogen fuel cell 900.

The pyrolysis unit 100 thermally decomposes waste. For example, the pyrolysis unit 100 pyrolyzes the waste by heating crushed waste introduced from a waste crusher 50 in an oxygen-free or low-oxygen atmosphere. To obtain a pyrolysis gas containing a large amount of low hydrocarbons with a low carbon number through waste pyrolysis, a high-temperature pyrolysis process above 750° C. is required.

The pyrolysis unit 100 may include a burner 120 that burns fuel to supply heat required for the waste pyrolysis. Pyrolysis gas as the fuel may be supplied to the burner 120 from the pyrolysis gas purification unit 300. The burner 120 burns the pyrolysis gas to generate combustion gas.

The waste pyrolysis produces solid (e.g., carbon ash) and oil-gas mixture. The solid (e.g., carbon ash) generated in the waste pyrolysis process is discharged to the outside, and the oil-gas mixture is supplied to the oil-gas separation unit 200 to be separated into oil and gas. The oil separated by the oil-gas separation unit 200 is supplied to the oil heating unit 600 to be reheated, and the separated gas is supplied to the pyrolysis gas purification unit 300 as the pyrolysis gas.

The oil heating unit 600 heats the oil supplied from the oil-gas separation unit 200 to separate volatile gas from the oil. The volatile gas and the pyrolysis gas are supplied to the pyrolysis gas purification unit 300. This increases the production of purified pyrolysis gas.

The remaining oil from which volatile substances are removed through the heating is sprayed into the oil-gas separator 200 to remove tar. The tar is washed off by the sprayed oil and discharged to the outside together with the oil. This process minimizes the amount of tar contained in the pyrolysis gas supplied to the pyrolysis gas purification unit 300.

The pyrolysis gas purification unit 300 serves to remove substances that may adversely affect catalyst to be used in the pyrolysis gas reforming unit 1000 from the pyrolysis gas before the pyrolysis gas enters the pyrolysis gas reforming unit 1000. For example, the pyrolysis gas purification unit 300 may be a wet scrubber device for removing hydrogen chloride (HCl), hydrogen sulfide ($H_2S$), or the like, or may be a tar removal device for removing fine particulate tar.

Figure 2:
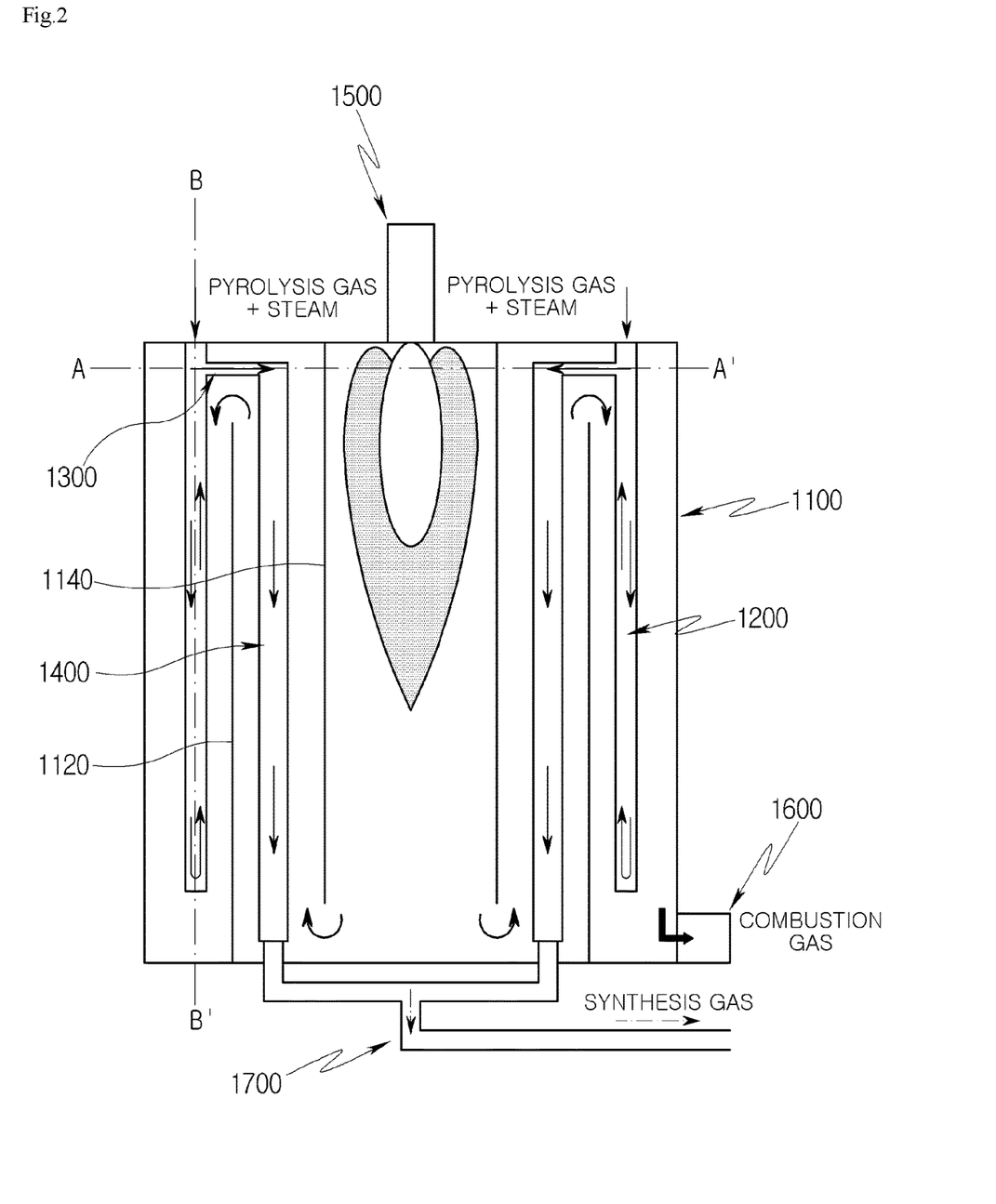
FIG. 2 is a cross-sectional view illustrating a pyrolysis gas reforming unit of FIG. 1.
Figure 3:
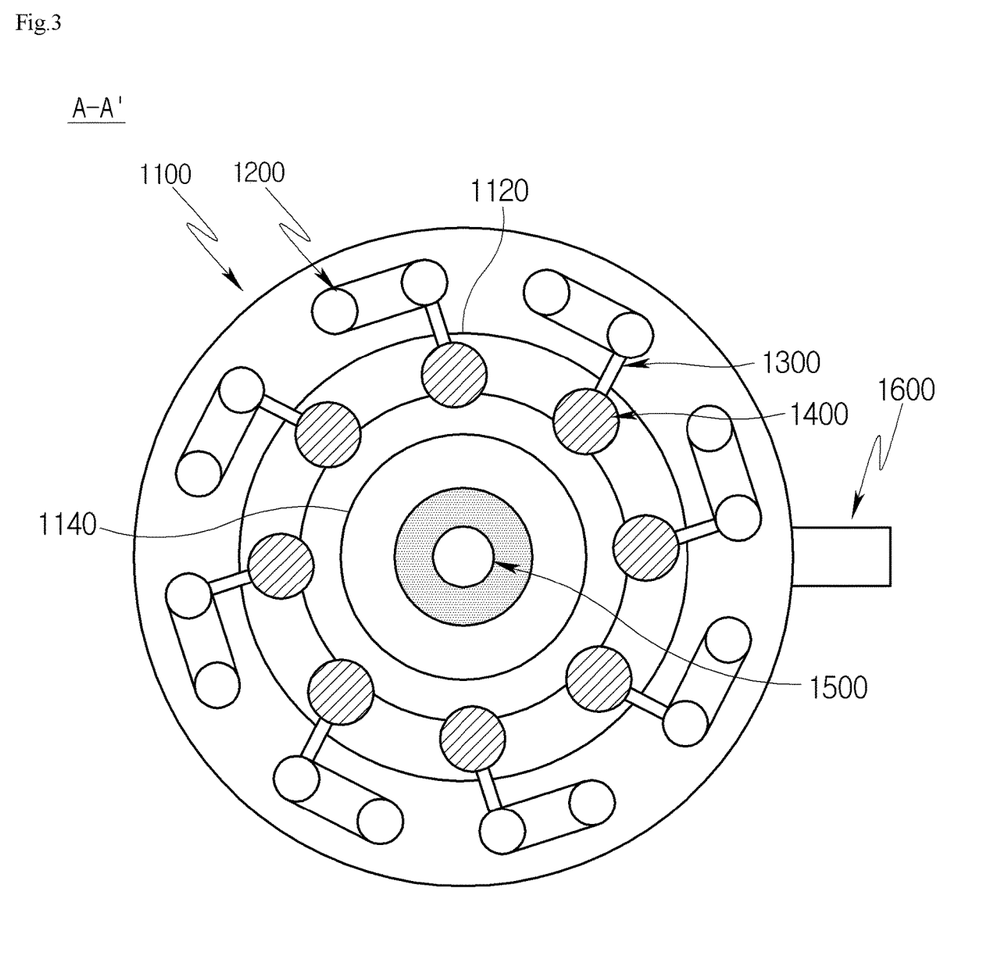
FIG. 3 is a cross-sectional view taken along line A-A' of FIG. 2.
Figure 4:
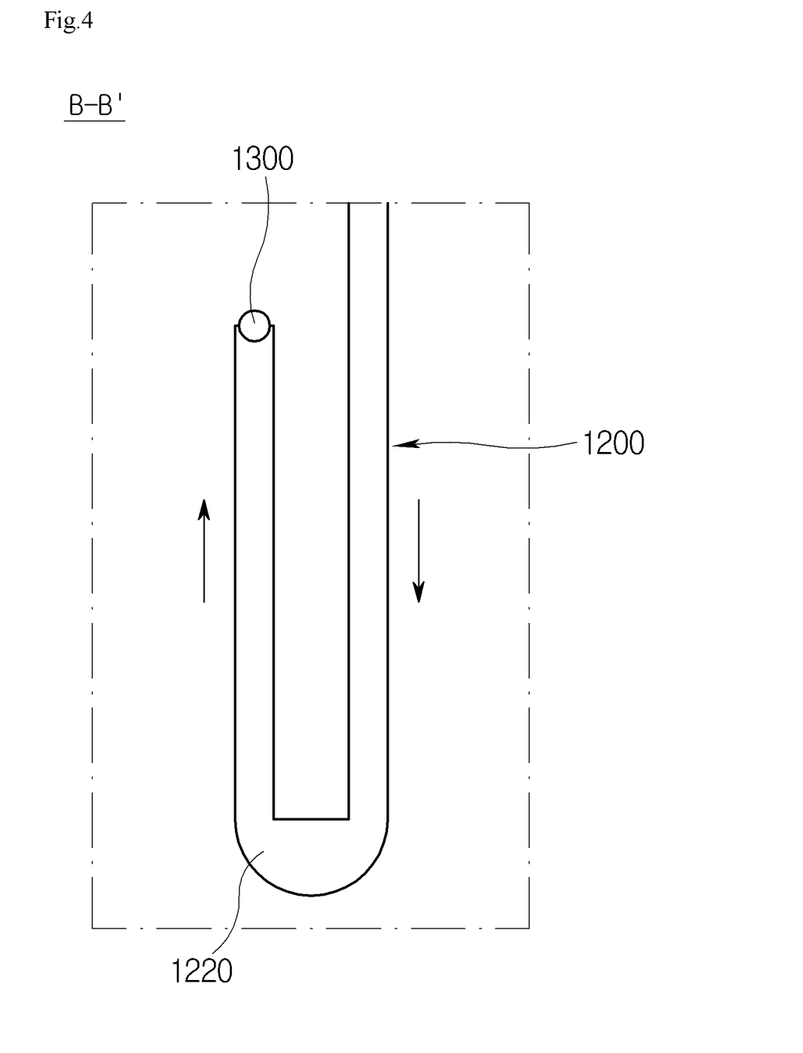
FIG. 4 is a cross-sectional view taken along line B-B' of FIG. 2.

The pyrolysis gas reforming unit 1000 reforms the pyrolysis gas purified by the pyrolysis gas purification unit 300 to generate synthesis gas. FIG. 2 is a cross-sectional view illustrating the pyrolysis gas reforming unit 1000 of FIG. 1. FIG. 3 is a cross-sectional view taken along line A-A' of FIG. 2. FIG. 4 is a cross-sectional view taken along line B-B' of FIG. 2.

Referring to FIGS. 2 to 4, the pyrolysis gas reforming unit 1000 includes a body 1100, a first catalyst tube 1200, an intermediate tube 1300, a second catalyst tube 1400, a burner 1500, a combustion gas discharge unit 1600, and a synthesis gas discharge unit 1700.

The body 1100 is formed in a cylindrical shape having an inner space to define an external shape of the pyrolysis gas reforming unit. However, it is understood that the shape of the body 1100 is not limited to the cylindrical shape. Two or more catalyst tubes containing different catalysts reacting at different temperatures are disposed in the body 1100. For example, the first catalyst tube 1200 is used to reform hydrocarbons ($C_xH_y$) having two or more carbon atoms into methane ($CH_4$), and the second catalyst tube 1400 is used to reform methane ($CH_4$) into synthesis gas containing hydrogen ($H_2$) and carbon monoxide (CO). The first catalyst tube 1200 reacts at a first temperature T1, and the second catalyst tube 1400 reacts at a second temperature T2 higher than the first temperature T1.

The first temperature T1, which is the reaction temperature of the first catalyst tube 1200, may be about 350° C. to 550° C., and a catalyst for reforming hydrocarbons having two or more carbon atoms is used. For example, a nickel-based catalyst using MgO or $Al_2O_3$ or a combination thereof as a support may be used for the first catalyst tube 1200. For this reason, in the first catalyst tube 1200, higher hydrocarbons having 2 or more carbon atoms, such as ethane, propane, and butane, may be converted into methane, carbon monoxide, and hydrogen through reactions represented by Reaction Formulas 1 and 2 below.

$C_nH_m + nH_2O \rightarrow nCO + (n+m/2)H_2$     Reaction Formula 1:

$CO + 3H_2 \rightarrow CH_4 + H_2O$     Reaction Formula 2:

The second temperature T2, which is the reaction temperature of the second catalyst tube 1400, may be about 700° C. to 900° C., and a catalyst for reforming methane is used. For example, a nickel-based catalyst may also be used for the second catalyst tube 1400. Accordingly, in the second catalyst tube 1400, methane may be converted into synthesis gas mainly composed of hydrogen and carbon monoxide through a reaction represented by Reaction Formula 3 below.

$CH_4 + H_2O \rightarrow CO + 3H_2$     Reaction Formula 3:

The first catalyst tube 1200 and the second catalyst tube 1400 are connected via the intermediate tube 1300 so that the pyrolysis gas and steam supplied to the first catalyst tube 1200 sequentially flow through the first catalyst tube 1200, the intermediate tube 1300, and the second catalyst tube 1400. Accordingly, although the pyrolysis gas supplied to the first catalyst tube 1200 contains a large amount of hydrocarbons having two or more carbon atoms, the pyrolysis gas can be reformed into synthesis gas through steam reforming reactions while sequentially passing through the first catalyst tube 1200 and the second catalyst tube 1400. That is, higher hydrocarbons having two or more carbon atoms may be converted into methane while passing through the first catalyst tube 1200, and the methane may be converted into synthesis gas while passing through the second catalyst tube 1400. Accordingly, there is no need to additionally install a preliminary reformer, thereby simplifying the structure and process for pyrolysis gas reforming.

The burner 1500 for supplying heat to the first catalyst tube 1200 and the second catalyst tube 1400 is installed in an upper center of the body 1100. Pyrolysis gas as the fuel may be supplied to the burner 1500 from the pyrolysis gas purification unit 300. The burner 1500 burns the pyrolysis gas to generate combustion gas. The generated combustion gas is discharged to the outside through the center of the body 1100.

Because the second catalyst tube 1400 reacts at a higher temperature than the first catalyst tube 1200, the combustion gas discharged from the burner 1500 first supplies heat to the second catalyst tube 1400, and then supplies heat to the first catalyst tube 1200. To this end, the second catalyst tube 1400 is positioned radially inside the body 1100 rather than the first catalyst tube 1200. Referring to FIG. 3, the first catalyst tube 1200 and the second catalyst tube 1400 may include a plurality of first catalyst tubes 1200 and a plurality of second catalyst tubes 1400. The plurality of second catalyst tubes 1400 are arranged at intervals in a circumferential direction of the body 1100. FIG. 3 illustrates a case in which eight second catalyst tubes 1400 are spaced apart from each other at regular intervals along the circumferential direction of the body 1100, but it is understood that this is only an example and other exemplary embodiments are not limited thereto. Also, the plurality of first catalyst tubes 1200 are spaced apart from each other along the circumferential direction of the body 1100 and are disposed to surround the plurality of second catalyst tubes 1400. The plurality of first catalyst tubes 1200 and the plurality of second catalyst tubes 1400 extend vertically along a longitudinal direction of the body 1100.

The number of the first catalyst tubes 1200 may be equal to the number of the second catalyst tubes 1400, and the first catalyst tubes 1200 and the second catalyst tubes 1400 may be connected one-to-one. Therefore, the number of the intermediate tubes 1300 is the same as the number of the first catalyst tubes 1200 and as the number of the second catalyst tubes 1400. For example, eight first catalyst tubes 1200 are arranged to surround eight second catalyst tubes 1400, and the eight first catalyst tubes 1200 are connected to the eight second catalyst tubes 1400, respectively. However, it is understood that this is only an example and other exemplary embodiments are not limited thereto. Alternatively, the number of the second catalyst tubes 1400 may be greater than the number of the first catalyst tubes 1200 so that each first catalyst tube 1200 may be connected to a plurality of second catalyst tubes 1400.

Referring to FIG. 4, the first catalyst tube 1200 has a U-curved portion 1220. For example, each of the plurality of first catalyst tubes 1200 extends vertically downward from an upper side of the body 1100, then curves in a U shape at a lower end (i.e., U-curved portion 1220), and then extends vertically upward. The number of U-curved portions 1220 may be adjusted according to a catalyst reaction time. As the required catalyst reaction time increases, the number of U-curved portions 1220 may increase.

It is preferable that the U-curved portion 1220 extends along the circumferential direction of the body 1100. That is, the vertically extending portions in each of the plurality of first catalyst tubes 1200 are positioned at the same radial distance from the center of the body 1100. Accordingly, the length of the first catalyst tube 1200 can be adjusted according to the required catalyst reaction time, and a reformer complex can be formed in a compact configuration. In addition, each of the plurality of second catalyst tubes 1400 may also have a U-curved portion.

Referring to FIG. 3, a first wall 1120 and a second wall 1140 are provided in the body 1100. The first and second walls 1120 and 1140 serve to guide the flow of the combustion gas discharged from the burner 1500 to effectively supply heat to the first catalyst tubes 1200 and the second catalyst tubes 1400. The first wall 1120 is provided between the first catalyst tube 1200 and the second catalyst tube 1400, and extends vertically upward from the lower side of the body 1100. The second wall 1140 is disposed inside the second catalyst tube 1400 in the radial direction, and extends vertically downward from the upper side of the body 1100. Accordingly, the combustion gas discharged from the burner 1500 flows in a zigzag direction along the longitudinal direction of the first catalyst tube 1200 and the second catalyst tube 1400, thereby supplying sufficient heat to the first and second catalyst tubes and generating a temperature gradient.

Referring to FIG. 2, the combustion gas discharged from the burner 1500 flows downward, passes to the second catalyst tube 1400 through a space under the second wall 1140, and flows upward to supply heat to the catalyst tube 1400. Thereafter, the combustion gas that is slightly cooled to heat the second catalyst tube 1400 passes a space above the first wall 1120 and flows toward the first catalyst tube 1200 to provide heat to a next first catalyst tube 1200. After supplying heat to the first catalyst tube 1200 and the second catalyst tube 1400, the combustion gas is discharged to the outside by the combustion gas discharge unit 1600 provided in the body 1100.

As described above, the pyrolysis gas sequentially flows through the first catalyst tube 1200 and the second catalyst tube 1400 and may be reformed into synthesis gas through steam reforming. The synthesis gas discharge unit 1700 for discharging synthesis gas is connected to the second catalyst tube 1400. The synthesis gas discharge unit 1700 may collect the synthesis gas generated by the plurality of second catalyst tubes 1400 and discharge the synthesis gas to the outside.

The synthesis gas discharged to the outside through the synthesis gas discharge unit 1700 is supplied to the hydrogen gas shift reaction unit 400. The hydrogen gas shift reaction unit 400 converts carbon monoxide contained in the synthesis gas generated by the pyrolysis gas reforming unit 1000 into hydrogen and carbon dioxide through the following equation represented by Reaction Formula 4. This reaction may increase the hydrogen yield.

$$CO+H_2O \rightarrow CO_2+H_2 \qquad \text{Reaction Formula 4:}$$

The hydrogen separation unit 500 separates hydrogen from the synthesis gas discharged from the hydrogen gas shift reaction unit 400. For example, the hydrogen separation unit 500 may use an adsorption method, a membrane separation method, a deep cooling method, or the like. Among the methods, pressure swing adsorption (PSA) is a separation process using the difference in the amount of gas adsorbed by an adsorbent, and this process separates hydrogen by adsorbing and removing impurity gases other than hydrogen gas using an adsorbent. If the pressure is high, impurities are removed by adsorption. On the other hand, if the pressure is low, the adsorbed substances are desorbed and the adsorbent is regenerated.

The hydrogen separated by the hydrogen separation unit 500 can be used in various ways. FIG. 1 illustrates a case in which the separated hydrogen is supplied to the hydrogen turbine 800 and the hydrogen fuel cell 900, but it is understood that this is only an example and other exemplary embodiments are not limited thereto.

In order to bring the pyrolysis unit 100 to a high temperature, combustion gas generated by the burner 1500 of the pyrolysis gas reforming unit 1000 and used to supply heat to the pyrolysis gas reforming unit 1000 is used to heat the pyrolysis unit 100. For example, the combustion gas is discharged to the outside through the combustion gas discharge unit 1600 provided in the main body 1100 after heating the first catalyst tube 1200 and the second catalyst tube 1400. The discharged combustion gas is used to indirectly heat the pyrolysis unit 100. For example, the combustion gas may indirectly heat the pyrolysis unit 100 while passing through a pipe provided in the pyrolysis unit 100. The combustion gas is discharged to the outside after indirectly heating the pyrolysis unit 100.

The pyrolysis gas reforming system may further include a steam generation unit 700 that generates and supplies steam to the pyrolysis gas reforming unit 1000. The combustion gas discharged from the pyrolysis gas reforming unit 1000 supplies heat to the steam generation unit 700 first, and then supplies heat to the pyrolysis unit 100. In the steam generation unit 700, water is heated by the waste heat of the combustion gas discharged from the pyrolysis gas reforming unit 1000 to change to steam, and the steam is supplied to the pyrolysis gas reforming unit 1000 to be used for steam reforming. This steam may also be supplied to the hydrogen gas shift reaction unit 400.

In addition, the pyrolysis unit 100 may be heated by using heat of exhaust gas discharged from the hydrogen separation unit 500. The exhaust gas may indirectly heat the pyrolysis unit 100 while passing through a pipe provided in the pyrolysis unit 100. The exhaust gas is discharged to the outside after heating the pyrolysis unit 100 indirectly.

The combustion gas discharged from the pyrolysis gas reforming unit 1000 and the exhaust gas discharged from the hydrogen separation unit 500 may also supply heat to the oil heating unit 600. Accordingly, an additional heat source for heating the oil is not required. That is, the oil can be indirectly heated using waste heat of the combustion gas and the exhaust gas. In addition, the heat of the combustion gas that is generated by the burner 120 of the pyrolysis unit 100 and is discharged after being used to provide heat in the pyrolysis unit 100 may be supplied to the oil heating unit 600 to heat the oil. Alternatively, the oil heating unit 600 is indirectly heated by only one of the combustion gas discharged from the pyrolysis gas reforming unit 1000, the exhaust gas discharged from the hydrogen separation unit 500, and the combustion gas discharged from the pyrolysis unit 100.

In this way, the heat of the combustion gas generated by the burner 120 of the pyrolysis unit 100 and waste heat of the combustion gas discharged from the pyrolysis gas reforming unit 1000 and waste heat of the exhaust gas discharged from the hydrogen separation unit 500 are supplied to the pyrolysis unit 100. Therefore, the pyrolysis unit 100 can maintain a high temperature, and thus the production of pyrolysis gas can be increased. In addition, it is possible to reduce the amount of the pyrolysis gas burned by the burner 120 of the pyrolysis unit 100, and the hydrogen production through the reforming of the pyrolysis gas can be increased.

In addition, in order to increase the efficiency of the pyrolysis gas reforming unit 1000, the exhaust gas discharged from the hydrogen turbine 800 driven using the hydrogen separated from the hydrogen separation unit 500 may be used to heat the pyrolysis gas reforming unit 1000. The exhaust gas is discharged to the outside after it is used to indirectly heat the pyrolysis gas reforming unit 1000.

Figure 5:
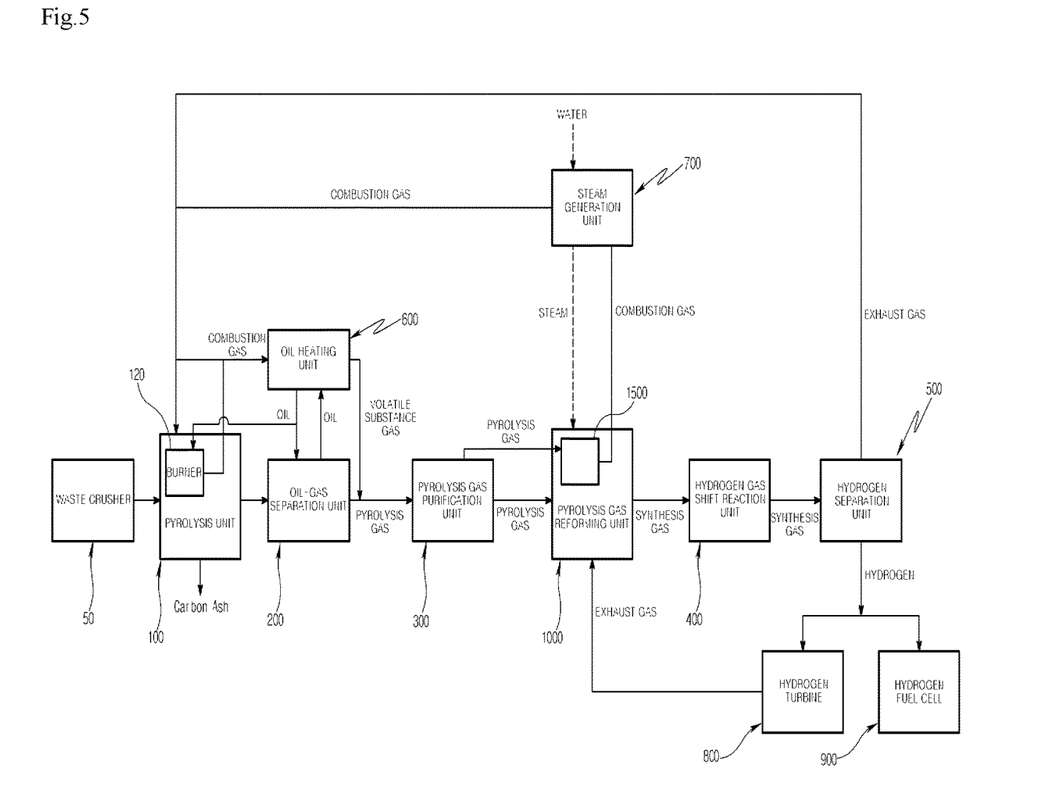
FIG. 5 is a schematic view illustrating a pyrolysis gas reforming system according to a second exemplary embodiment.

FIG. 5 is a schematic view illustrating a pyrolysis gas reforming system according to a second exemplary embodiment.

Because the pyrolysis gas reforming system according to the second exemplary embodiment has the same structure as the pyrolysis gas reforming system according to the first exemplary embodiment except for the fuel supplied to the burner 120 of the pyrolysis unit 100, a redundant description of the same configuration will be omitted.

Referring to FIG. 5, the burner 120 in the pyrolysis unit 100 burns fuel to supply heat required for pyrolysis of waste. Unlike the first exemplary embodiment in which pyrolysis gas is supplied as fuel to the burner 120, oil from which volatile substances are removed from the oil heating unit 600 is supplied as fuel to the burner 120. Accordingly, the oil is burned by the burner 120 to generate combustion gas. Although FIG. 5 illustrates that the oil is supplied only to the burner 120 of the pyrolysis unit 100, it is understood that the oil may also be supplied to the burner 1500 of the pyrolysis gas reforming unit 1000.

According to the exemplary embodiment, because the burner does not use the pyrolysis gas as fuel, the amount of pyrolysis gas that is internally used can be minimized, and the production of hydrogen can be maximized through the reforming of the pyrolysis gas.

While exemplary embodiments have been described with reference to the accompanying drawings, it is to be understood by those skilled in the art that various modifications in form and details may be made therein without departing from the sprit and scope as defined by the appended claims. Therefore, the description of the exemplary embodiments should be construed in a descriptive sense and not to limit the scope of the claims, and many alternatives, modifications, and variations will be apparent to those skilled in the art.

What is claimed is:

1. A pyrolysis gas reforming system comprising:
   a pyrolysis unit configured to perform pyrolysis of waste;
   an oil-gas separation unit configured to separate a product generated by the pyrolysis unit into oil and gas;
   a pyrolysis gas purification unit configured to refine pyrolysis gas generated through the separation by the oil-gas separation unit;
   a pyrolysis gas reforming unit configured to generate synthesis gas by reforming the pyrolysis gas purified by the pyrolysis gas purification unit;
   a hydrogen gas shift reaction unit configured to convert carbon monoxide contained in the synthesis gas generated by the pyrolysis gas reforming unit into hydrogen and carbon dioxide; and
   a hydrogen separation unit configured to separate hydrogen from the synthesis gas discharged from the hydrogen gas shift reaction unit; and
   an oil heating unit configured to heat the oil produced through the oil and gas separation performed by the oil-gas separation unit,
   wherein combustion gas generated by a burner of the pyrolysis gas reforming unit and used to supply heat to the pyrolysis gas reforming unit is used to supply heat to the pyrolysis unit,
   wherein volatile gas generated in the oil heating unit is separated and supplied to the pyrolysis gas purification unit together with the pyrolysis gas.

2. The system according to claim 1, further comprising a steam generation unit configured to generate steam and supply the steam to the pyrolysis gas reforming unit.

3. The system according to claim 2, wherein the combustion gas discharged from the pyrolysis gas reforming unit is used to supply heat to the pyrolysis unit after supplying heat to the steam generation unit.

4. The system according to claim 1, wherein exhaust gas discharged from the hydrogen separation unit is used to supply heat to the pyrolysis unit.

5. The system according to claim 1, wherein tar is removed by spraying the oil from which the volatile gas is removed by the oil heating unit to the oil-gas separation unit.

6. The system according to claim 1, wherein the oil from which the volatile gas is removed by the oil heating unit is supplied to a burner of the pyrolysis unit and burned.

7. The system according to claim 1, wherein the oil from which the volatile gas is removed by the oil heating unit is supplied to the burner of the pyrolysis gas reforming unit and burned.

8. The system according to claim 1, wherein in the oil heating unit, the oil is heated by at least one gas selected from among the combustion gas discharged from the pyrolysis gas reforming unit, the exhaust gas discharged from the hydrogen separation unit, and the combustion gas generated by the burner of the pyrolysis unit, used to supply heat to the pyrolysis unit, and then discharged.

9. The system according to claim 1, further comprising a hydrogen turbine driven using oxygen received from the hydrogen separation unit.

10. The system according to claim 9, wherein exhaust gas discharged from the hydrogen turbine is used to supply heat to the pyrolysis gas reforming unit.

11. The system according to claim 1, wherein the pyrolysis gas is supplied to a burner of the pyrolysis unit and burned.

12. The system according to claim 1, wherein the pyrolysis gas is supplied to the burner of the pyrolysis gas reforming unit and burned.

13. A pyrolysis gas reforming system comprising:
   a pyrolysis unit configured to perform pyrolysis of waste;
   an oil-gas separation unit configured to separate a product generated by the pyrolysis unit into oil and gas;
   a pyrolysis gas purification unit configured to refine pyrolysis gas generated through the separation by the oil-gas separation unit;
   a pyrolysis gas reforming unit configured to generate synthesis gas by reforming the pyrolysis gas purified by the pyrolysis gas purification unit;
   a hydrogen gas shift reaction unit configured to convert carbon monoxide contained in the synthesis gas generated by the pyrolysis gas reforming unit into hydrogen and carbon dioxide; and
   a hydrogen separation unit configured to separate hydrogen from the synthesis gas discharged from the hydrogen gas shift reaction unit; and
   an oil heating unit configured to heat the oil produced through the oil and gas separation performed by the oil-gas separation unit,
   wherein exhaust gas discharged from the hydrogen separation unit is used to supply heat to the pyrolysis unit,
   wherein volatile gas generated in the oil heating unit is separated and supplied to the pyrolysis gas purification unit together with the pyrolysis gas.

14. The system according to claim 13, wherein the oil from which volatile gas is removed by the oil heating unit is supplied as fuel to a burner of the pyrolysis unit and burned to generate combustion gas.

15. The system according to claim 13, wherein the oil from which volatile gas is removed by the oil heating unit is supplied to a burner of the pyrolysis gas reforming unit and burned.

\* \* \* \* \*